(12) United States Patent
Imielinski et al.

(10) Patent No.: US 7,730,395 B2
(45) Date of Patent: *Jun. 1, 2010

(54) VIRTUAL TAGS AND THE PROCESS OF VIRTUAL TAGGING

(75) Inventors: Tomasz Imielinski, Princeton, NJ (US); Vince Sgro, Somerset, NJ (US); Don Smith, East Brunswick, NJ (US)

(73) Assignee: Rutgers, The State University of New Jersey

( * ) Notice: Subject to any disclaimer, the term of this patent is extended or adjusted under 35 U.S.C. 154(b) by 1132 days.

This patent is subject to a terminal disclaimer.

(21) Appl. No.: 11/283,308

(22) Filed: Nov. 18, 2005

(65) Prior Publication Data

US 2006/0101332 A1 May 11, 2006

Related U.S. Application Data

(63) Continuation of application No. 09/750,505, filed on Dec. 28, 2000, now Pat. No. 7,055,094.

(60) Provisional application No. 60/173,757, filed on Dec. 30, 1999.

(51) Int. Cl.
*G06F 17/00* (2006.01)
(52) U.S. Cl. .................. 715/236; 715/234; 715/249
(58) Field of Classification Search ............ 715/234, 715/236, 249; 707/3
See application file for complete search history.

(56) References Cited

U.S. PATENT DOCUMENTS

| 5,890,177 A | 3/1999 | Moody et al. .............. 715/511 |
| 5,913,214 A | 6/1999 | Madnick et al. ............. 707/10 |
| 5,918,013 A | 6/1999 | Mighdoll et al. ........... 709/217 |
| 5,956,709 A | 9/1999 | Xue ............................. 707/3 |

(Continued)

OTHER PUBLICATIONS

Haake, Jorg M., Facilitating Orientation in Shared Hypermedia Workspaces, ACM Conference on Supporting Group Work, Nov. 1999, p. 365-374.

(Continued)

*Primary Examiner*—Adam M Queler
(74) *Attorney, Agent, or Firm*—The Belles Group, P.C.

(57) ABSTRACT

The present invention relates to a method and system for transformation of an electronic document through learning transformation rules during training from the original electronic document using visual user feedback and applying the learned transformation rules to either the original electronic document or a second electronic document having a similar structure as the original document or all future instances of the original electronic document. Accordingly, the transformed document is customized to the user's preference learned during training. Preferably, the transformed document is created in a queriable form. For example, the original electronic document can be defined any type of mark-up language or electronic document generation language, such as Hypertext mark-up language (HTML), extended mark-up language (XML), portable data file (PDF) or Microsoft® Word, and the like and the transformed document is defined in a queriable language such as (XML) views and the like. For example, a virtual page can be a customization of an instance of a Web page which can be used to transform all future instances of the original Web page. Alternatively, the virtual page is formed form a customization of an original electronic document, such as a chapter in a book, which is applied to a second electronic document having a similar structure, such as all chapters in the book.

68 Claims, 13 Drawing Sheets

U.S. PATENT DOCUMENTS

| | | | |
|---|---|---|---|
| 6,009,429 A | 12/1999 | Greer et al. | 707/10 |
| 6,012,098 A | 1/2000 | Bayeh et al. | 709/246 |
| 6,023,715 A | 2/2000 | Burkes et al. | 715/514 |
| 6,083,276 A | 7/2000 | Davidson et al. | 717/107 |
| 6,108,637 A | 8/2000 | Blumenau | 705/7 |
| 6,128,655 A | 10/2000 | Fields et al. | 709/219 |
| 6,247,032 B1 | 6/2001 | Bernardo et al. | 715/530 |
| 6,584,480 B1 * | 6/2003 | Ferrel et al. | 715/205 |
| 6,589,291 B1 | 7/2003 | Boag et al. | 715/513 |
| 2001/0037405 A1 * | 11/2001 | Sideek | 709/246 |

OTHER PUBLICATIONS

Niemi et al., Constructing OLAP Cubes Based on Queries, Proc. 4th ACM International Workshop on Datawarehousing and OLAP, Atlanta, GA USA, p. 9-15, 2001, ISBN:1-58113-437-1.

* cited by examiner

VIRTUAL TAGS AND THE PROCESS OF VIRTUAL TAGGING

CROSS-REFERENCE TO RELATED APPLICATION

This application is a continuation of U.S. patent application Ser. No. 09/750,505 filed Dec. 28, 2002, now U.S. Pat. No. 7,055,094 which claims priority on U.S. Provisional Patent Application No. 60/173,757 filed Dec. 30, 1999, hereby incorporated in its entirety by reference into this application.

BACKGROUND OF THE INVENTION

1. Field of the Invention

The present invention relates to a system and method for establishing and implementing user defined virtual tags which can be used to mark items of an original electronic document that the user is interested in displaying and creating a customized document which can be updated from the virtual tags and extraction rules used for implementing the virtual tags.

2. Description of the Related Art

The World Wide Web (WWW) is a collection of documents determined as Web pages resident on computers that are distributed over the Internet. Web pages are typically defined in Hypertext Mark-up Language (HTML). Multiple Web pages are sometimes linked together to form a Web site, which can be a collection of Web pages directed to a particular topic or theme.

Web pages often contain a vast amount of information which is much more than a user needs. However access to data residing on individual Web pages is hindered by the fact that there is no defined structure for organizing information on a Web page. Also it is difficult to determine the Web page scheme as it is buried in underlying HTML code. A further difficulty arises in that a similar visual effect as defined by the Web page scheme can be achieved with different HTML features such as HTML tables, ordered lists or HTML tagging.

Conventional proxy servers retrieve Web pages and syntactically transform them to better present their content on devices other than those intended to view those pages. U.S. Pat. No. 5,918,013 describes a method of transcoding Web documents in a network environment. A proxy server including a persistent document database which stores various attributes of all Web documents previously retained in a response to a request from the client. When a Web document is retrieved from a remote server in response to a request from the client, the database is consulted and the stored information related to the requested document is used by the proxy server to transcode the document. The document is transcoded to circumvent bugs found in the Web document, to size the document for display on a television set, to improve transmission efficiency of the document and to reduce latency. However, these proxy servers work purely by translating the page content into a more appropriate form. Accordingly, the systems are device driven rather than user driven.

Style sheets are used to set a style for a Web page or multiple Web pages. Style sheets provide information separate from the content of the page they reference. Accordingly, style sheets add functional display information to conventional tags physically present in a Web page.

Techniques have been described for extracting content from Web pages. U.S. Pat. No. 5,913,214 describes a system for extracting data from Web pages to be used to augment a traditional structured database. A user query is converted to a set of commands to interact with content of a Web page. A data retriever receives content from the Web page and translates the data from the data content of the Web page into a data content associated with the initial request.

U.S. Pat. No. 6,128,655 describes a method for recasting web content on a hosting site. The invention provides an automated system for replicating published web content and associated advertisements in the context of a hosting web site. At the hosting web site, the invention includes the process of brokering a client browser's request for a web page, analyzing the returned content and splitting it into component elements, extracting the desired component elements, recasting the desired elements in the look and feel of the hosting site and sending the recast content to the requesting client as a web page. Once the reformatted file is received at the client, the client browser interprets the HTML in the web page, presenting the content in the context of the hosting web site. The component original page is parsed into desired content elements using a filter definition. A filter designer determines items to be used in a recast page. The filter definition is used to break the content into component parts such as title area, primary and secondary advertisements and the content itself. The filter definitions can be created by the filter with analysis of the HTML source code, imbedded comments or delineators and through comparisons with similar documents. This method would be difficult to use with custom user modifications and on a dynamic Web page since a filter designer apart from the user is required to develop a filter for each modification of a user.

It is desirable to delimit and annotate information in a Web page by user interaction in order to allow portions of the Web pages to be identified for dynamic independent retrieval to provide a customized Web page layout.

SUMMARY OF THE INVENTION

The present invention relates to a method and system for transformation of an electronic document through learning transformation rules during training from the original electronic document using visual user feedback and applying the learned transformation rules to either the original electronic document or a second electronic document having a similar structure as the original document or all future instances of the original electronic document. Accordingly, the transformed document is customized to the user's preference learned during training. Preferably, the transformed document is created in a queriable form. For example, the original electronic document can be defined any type of mark-up language or electronic document generation language, such as Hypertext mark-up language (HTML), extended mark-up language (XML), portable data file (PDF) or Microsoft® Word, and the like and the transformed document is defined in a queriable language such as (XML) views and the like.

For example, a virtual page can be a customization of an instance of a Web page which can be used to transform all future instances of the original Web page. Alternatively, the virtual page is formed form a customization of an original electronic document, such as a chapter in a book, which is applied to a second electronic document having a similar structure, such as all chapters in the book.

The present invention provides a system and process of tagging portions of an electronic document by readers of the pages (users) rather than by content providers. The virtual tags are defined by a combination of context, for example words and phrases, structure of the page, for example paragraphs, item lists, and other content defined predicates. The transformation rules are used to customize the original electronic document, a second electronic document having a similar structure as the original document or all future instances of the original electronic document. Preferably, the transformation rules are used to transform the original electronic document defined in a mark-up language or document generating language into a queriable form. In one embodiment, the user feedback is used to create a virtual tag for tagging portions of a Web page.

Virtual tags can be visualized on the original electronic document, presenting the "user interest" distribution on different segments of the page. For example, frequently accessed or referenced areas on the page can be displayed in a different color, i.e. red.

Virtual tags can be determined by the user providing feedback from a graphic user interface GUI by reviewing the original electronic document. For example, the electronic document can be a Web page. The feedback is used to "learn" or "discover" using machine learning techniques such as that invariant web page scheme by learning extraction rules or definitions of subobjects and relationships among them. The virtual tags and extraction rules allow users to build extended mark-up language (XML) views of HTML pages through an entirely visual process, such as click and highlight.

Virtual tags are stored, along with their verbal descriptions, in a virtual repository. The virtual repository maintains a count of how often each virtual tag has been used and can communicate this information back to the owner of the Web page. In this manner, the Web page owner can be made aware which parts of the owned web pages are frequently requested and may decide to include that information in the Web page's tag structure. Accordingly, the process provides adaptive tagging of page content which reflects the information demand. This has the advantage that the more the page owner knows about that demand structure, the better he can tailor the tags on the Web page. In contrast, in the conventional "blind tagging" which involves the content provider tagging in anticipation of individual user interest, the content provider possesses no real knowledge of the user's interest. Additionally, virtual tags can be viewed and used by other clients, so the same process for creating virtual tags does not have to be repeated by the other clients. In this way all the users and the content providers are involved in the "collaborative tagging" of the web page. The process of virtual tagging can be used for XML pages, wherein users may choose to tag substructures of the XML objects defined by the content provider.

Virtual active tags can be used for sending messages about pre-specified changes of the tagged content to the user. In this manner, the users can monitor selected areas of the source pages without any additional effort on the part of the content provider. A content provider may set up a virtual active tag to provide messages to the page owner following user interest. Virtual active tags also allow tracking and monitoring of arbitrarily specific objects and data items which occur on the source web page without any additional effort necessary on the part of the owner of the source web page.

Virtual tags can include expiration clauses. The expiration clauses monitor source page changes that may affect the semantic correctness of the virtual tag. For example, due to the structural changes of a source web page, a virtual tag may no longer tag the content that corresponds to its semantic description. An expiration clause related to this "warning condition" may result in the review of the virtual tag definition by the user.

Virtual tagging can be used to enable small devices, such as PDAs, small screen phones, and phones with voice only input/output, to access information which has already been created on the Web for users equipped with general purpose graphic terminals. Virtual tagging is a scalable solution on the otherwise hopeless problem of having the content provider tag information on his web site in anticipation of any possible use of it on any device or any possible user interest. Virtual tags free the web page owner from any awareness of the devices that might access his page. Virtual tagging also allows the gathering of "micro-statistics" about user interest in page components. This can lead, possibly, to more focused advertising banners associated with virtual tags rather than with the entire page.

The method of the present invention has advantages over conventional decoding techniques since it is user driven rather than device driven. The present invention provides semantical extraction of pieces (such as headlines, bodies of text, stock quotes) and construction of user defined complex objects from these pieces. In an implementation of the method, Web page attributes are defined which allow the learning of extraction rules and discovering associations between different portions on a Web page. A user can use the learning techniques and build XML views on any Web page and have the determined extract rules work for all future instances of the Web page provided that it does not radically change its structure. Accordingly, the transformation rules are generated during training by the user and the generated transformation rules can be later applied without further input from the user, in that the user does not have to even be present when the transformation rules are applied.

For a better understanding of the present invention, reference may be made to the accompanying drawings.

BRIEF DESCRIPTION OF THE DRAWINGS

FIG. 9B is a flow diagram of a process of editing dynamic documents by reformatting of font features such as font size, color and the like.

DETAILED DESCRIPTION

Figure 1:
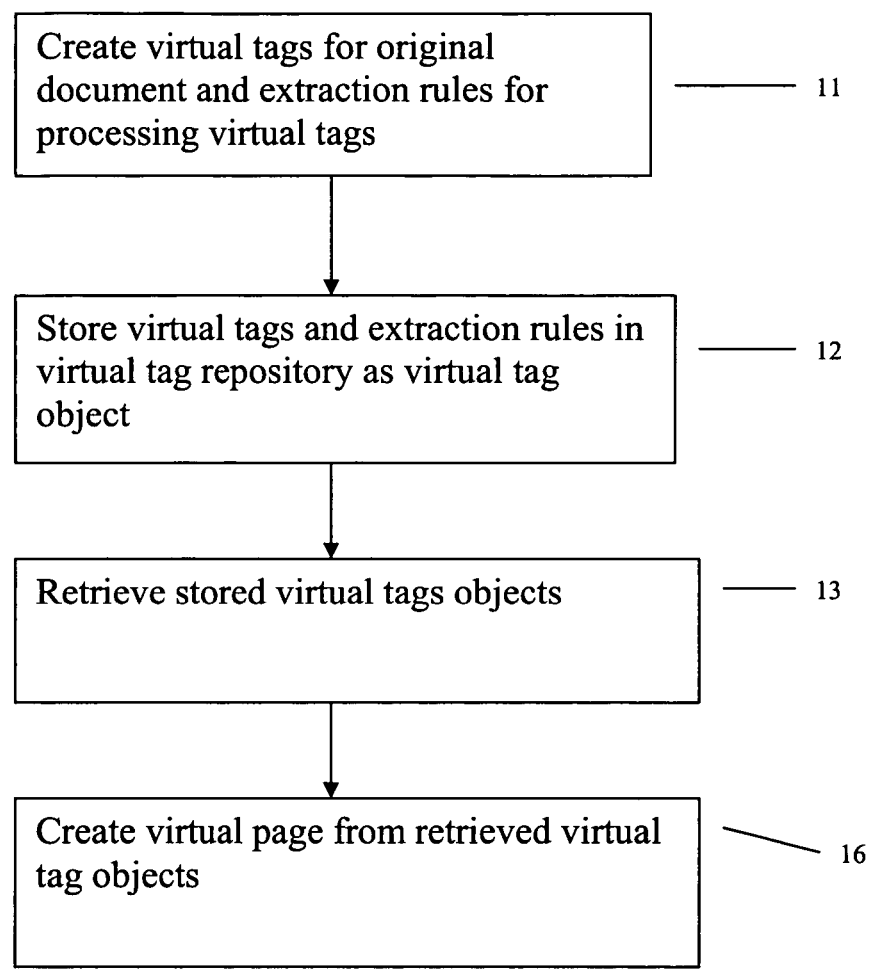
FIG. 1 is a flow diagram of a method for determining a virtual page.

Reference will now be made in greater detail to a preferred embodiment of the invention, an example of which is illus- FIG. 1 is a flow diagram of a method for determining a virtual page 10. A virtual page is a user customization of an original electronic document. In block 11, user interaction with the original electronic document is used to learn transformation rules. The user feedback can be used to generate one or more virtual tags. The virtual tag is considered virtual because they exists physically apart from the text of the electronic document they tag. The virtual tags are tied to the original document through procedural-action and descriptive expressions. The user creates the virtual tags to indicate preferences for inclusion of content of the original document, such as Web page. Transformation rules are generated to identify the procedural aspects for processing of the virtual tags. The transformation rules can extract information from the original electronic document and transform the information into the user customization. For example, the virtual tags and transformation rules can be used to build an XML view of an original Web page. The virtual tags could also be used to tag portions of any original electronic document, such as a chapter in a book.

In block 12, created virtual tags and transformation rules are stored in a virtual repository as a virtual tag object. A virtual tag object is used to embody a virtual tag and the procedural aspects and other information supporting the virtual tags implementation, such as the transformation rules. A virtual page is created by applying the transformation rules to the original electronic document or a second electronic document having a similar structure as the original document or all future instances of the original electronic document. The virtual page can also be stored in the virtual repository. The stored virtual tag objects are retrieved from the virtual repository, in block 13. In block 14, the retrieved virtual tag objects are used to create a virtual page.

Alternatively, the transformation rules determined in block 12 can be directly applied in block 15 to the original electronic document, a second electronic document having a similar structure as the original document or all future instances of the original electronic document without implementing storage and retrieval blocks 13 and 14.

Blocks 11 and 12 comprise a training aspect of method 10 in which a user provides visual feedback by interacting with an original electronic document, for example, a current version of a Web page, denoted as the original Web page, to generate virtual tags and transformation rules. The training aspect is determined once for the original electronic document unless there are substantial structural changes made to the original electronic document. Thereafter, blocks 13 and 14 are implemented in a processing aspect of method 10 in which a user applies the transformation rules to the original electronic document, a second electronic document having a similar structure as the original document or all future instances of the original electronic document. For example, the transformation rules can be applied to a current version of the original Web page. It will be appreciated that the current version of the original Web page is accessed after the training aspect. The current version of the original Web page can be the same or different than the original Web page.

Preferably, the transformation rules are determined from attributes of the original electronic document that have stability such that the formed transformation rules have stability. The stability of the transformation rules allows the transformation rules formed during training consistently provide the desired result when the transformation rules to be applied to the original electronic document, a second electronic document having a similar structure as the original document or all future instances of the original electronic document, without using additional training.

Figure 2:
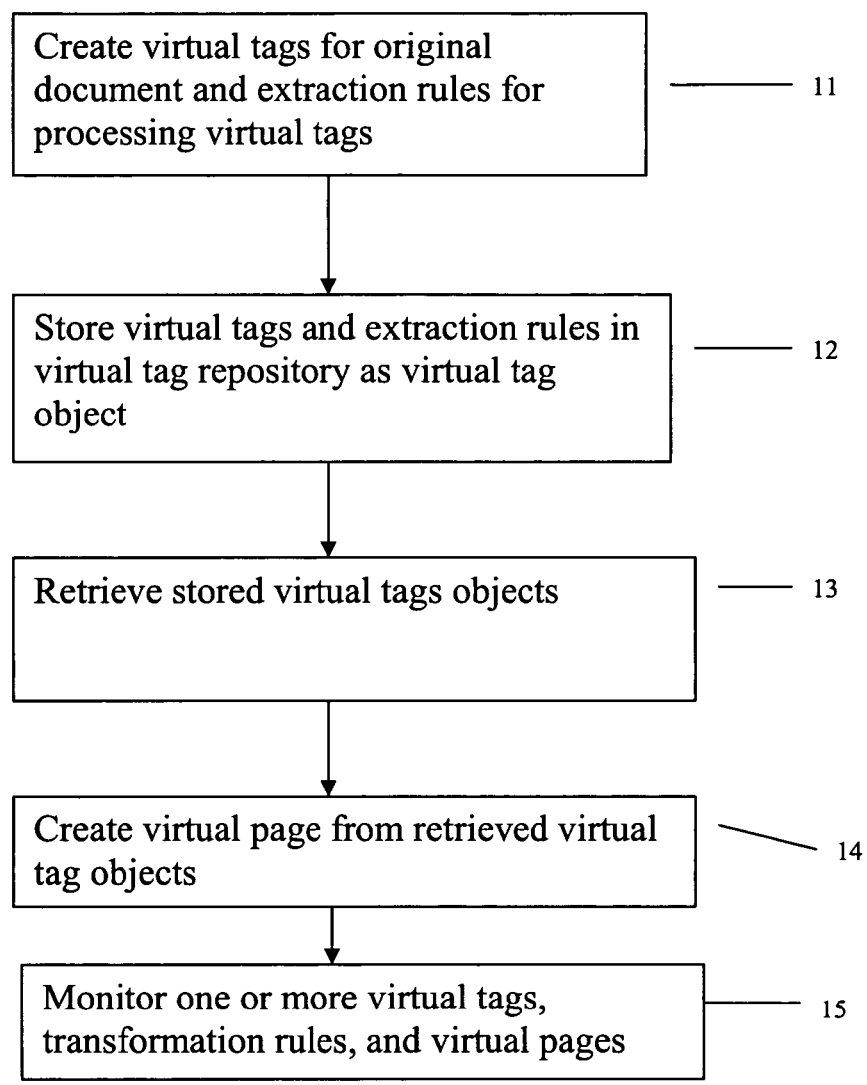
FIG. 2 is a flow diagram of a method for monitoring virtual tag or virtual page information.

FIG. 2 is a flow diagram of an implementation of method 10 for use in monitoring information related to virtual tags and virtual pages. In block 15, one or more of virtual tags generated in block 12 and virtual pages generated in block 14 are monitored. The monitoring of virtual tags and virtual pages provides microstatistics on user interest. In one embodiment, in block 12, the virtual tag is defined as a virtual active tag. If a virtual active tag is detected during monitoring in block 15 a message can be sent to the content provider, thereby the content provider can learn of the user's interest. In another alternative embodiment, block 15 can be used to monitor subscription to virtual tags and/or virtual pages by a user. The subscription to virtual tags and/or virtual pages indicates user interest to the content respectively defined by the virtual tag or virtual page.

Figure 3:
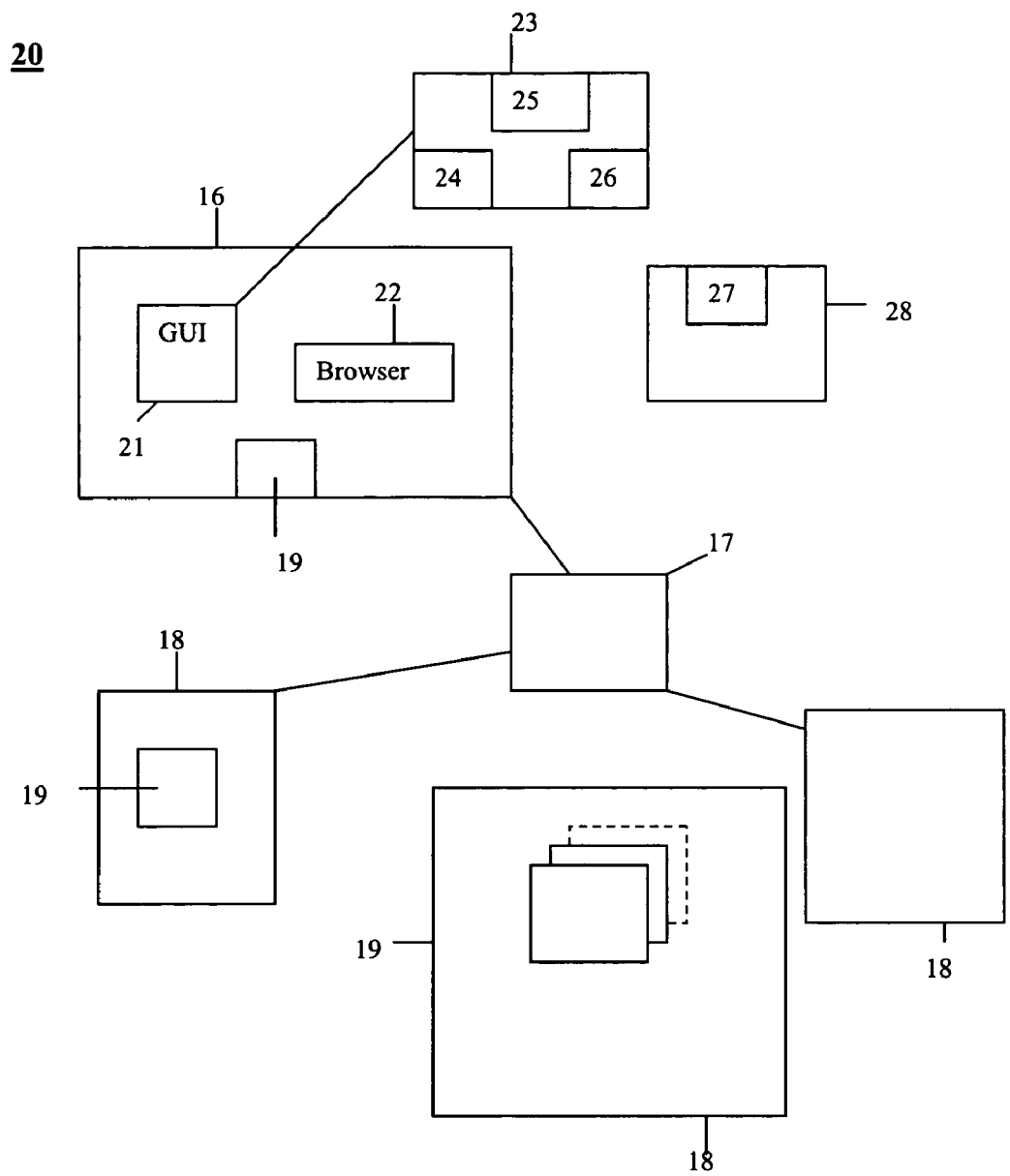
FIG. 3 is a schematic diagram of a system for determining a virtual page.

FIG. 3 illustrates a schematic diagram of a system for determining a virtual page 20. User system 16 is connectable over network connection 17 to one or more content providers 18. Preferably, network connection 17 is the Internet. Content provider 18 can provide electronic document 19 as Web pages as part of the World Wide Web (WWW). Alternatively, content providers provide an electronic document 19 in a markup language or a document generating language. In an alternate embodiment, electronic document 19 resides at user system 16 and is not accessed at content provider 18.

A graphical user interface 21 is used at user system 16 to visually interact with electronic document 19 to receive user interaction and construct user feedback. Graphical user interface 21 can interact with browser 22 to view electronic document 19 as a Web page.

Processing module 23 uses user feedback for creating transformation rules 25 and virtual tags 24 for tagging Web pages 19. Electronic documents 19 as Web pages that are virtually tagged can be addressed by for example: universal resource locators (URL)s, URLs obtained through CGI scripts running of a web server, i.e. results from searches or from submissions, where the CGI query is a part of the URL, and indirect links that are followed selectively based on user defined parameters. Graphical user interface 21 allows the user to visually point to areas of the original electronic document such as Web page with conventional input devices, such as a mouse, and processing module 23 defines virtual tags 24 contextually by using learning features which reflect the page structure as well as the features dependent on the semantics of the page content. Graphical user interface 21 can include a proxy to monitor user system 16 actions and learn from the access method how the user accessed the electronic document. For example, if user system is accessing a Web page the proxy can determine which links the user used to access the Web page.

Transformation rules 25 are generated by processing module 23 using user feedback from graphical user interface 21 and learning techniques. Transformation rules 25 are used to implement virtual tags 24. Transformation rules 25 are expressed in a language that clearly identifies how to process virtual tags 24 in order to extract information or transform information of the original electronic document that is tagged and to define extraction of information or transformation of information for subsequent versions of the original electronic document. Virtual pages 26 are generated from transformation rules 25.

Virtual tag objects 27 are generated by system 20 as incarnations of virtual tags 24 and transformation rules 25. Virtual tag objects 27 embody the procedural aspect of virtual tags 24 as defined by transformation rules 25 as well as any other information supporting the implementation of virtual tags 24. Virtual tags 24, transformation rules 25 and virtual pages 26 are stored in virtual repository 26. Virtual repository 28 can be located on user system 16. Alternatively, virtual repository 28 can be located remotely of user system 16 and networked to user system 16 and possibly other user systems. Virtual repository 28 is used for storage, retrieval, caching, monitoring, analysis, and enforcement of virtual tags 24, transformation rules 25 and virtual pages 26 and the information they delimit. Graphical user interface 21 also allows users, such as clients or servers, to view "micro-statistics" derived from the information system stored in virtual repository 28.

User system 16 and content provider 18 can comprise any computer or component connected or connectable in any known or later developed manner to a computer network such as the Internet. User system 16 and content provider 18 can be a personal computer such as an IBM compatible machine; Dell running any Windows 2000 (or the like) operating system. Of course, the invention may be run on a variety of computers or collection of computers under a number of different operating systems. The computers on which the client software and the hosting and content provider Web site reside could be, for example, a personal computer, a mini computer, mainframe computer or a hand held computer. Although the specific choice of computer is limited only by processor speed and disk storage requirements. User system 16 and content provider 18 can comprise devices such as a keyboard, a mouse, a display, processor, memory management and memory.

The method and system of the present invention are previously described in the context of an electronic document or Web page it will be appreciated that the method can be applied to a plurality of Web pages residing at a Web site or a plurality of Web sites, or any form of document comprising any of the following: text, images or graphics.

Figure 4:
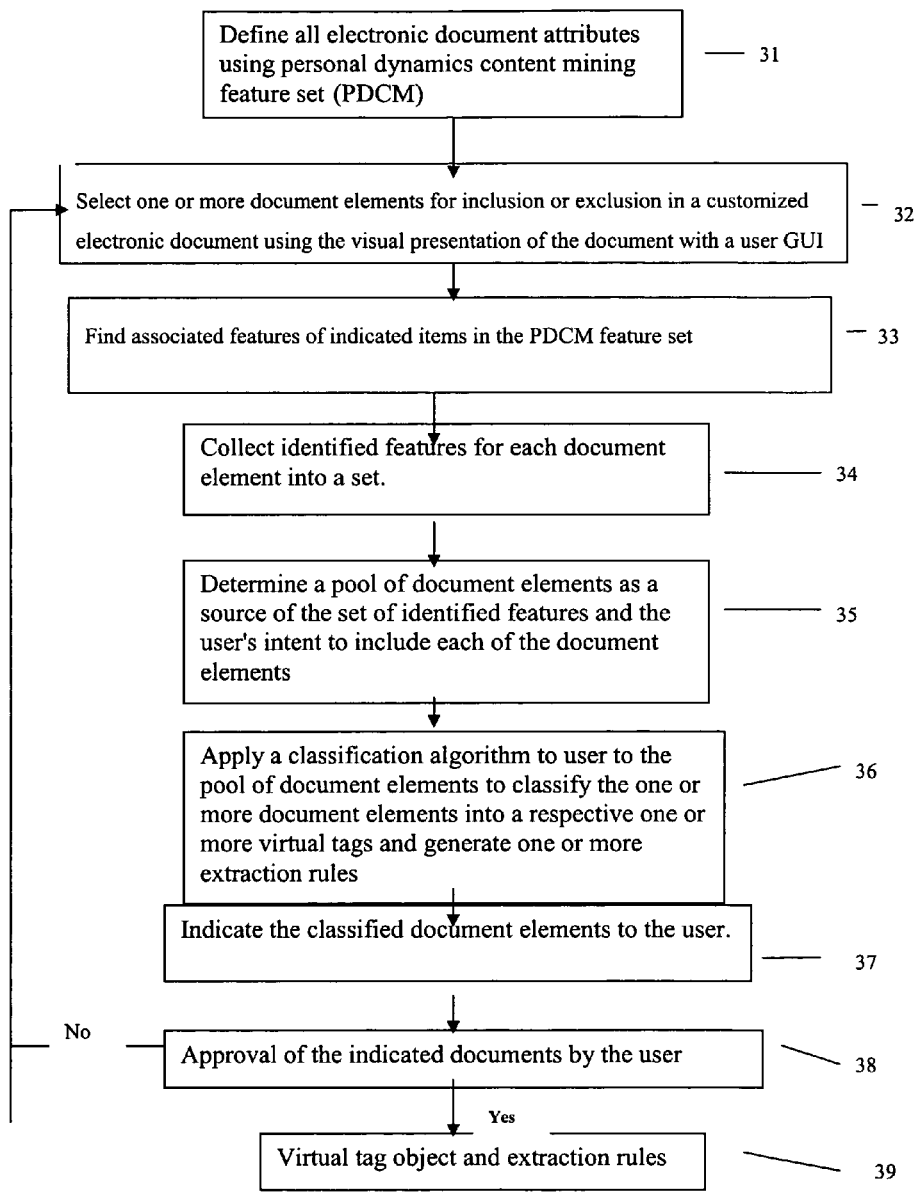
FIG. 4 is a flow diagram of a method for implementing the step of creating virtual tags.

FIG. 4 is a flow diagram of a method for implementing the step of creating virtual tags as described in block 12, referred to as method 30. In block 31, a personal dynamic content mining (PDCM) feature set is determined to define electronic document elements. For example, the PDCM feature set can define Web page elements and relationships to one another in an element description space and a path description space. The element description space assigns user selected elements of a Web page to a vector of features. A suitable feature set for the element description space is described in Table 1.

TABLE 1

Feature set of an element description space

1. Bold or not bold.
2. Italic or not italic.
3. Underline or not underline.
4. Superscript, subscript, or normal.
5. The number of links encountered before the document element within the current nested structure.
6. The site of the font.
7. The foreground color.
8. The background color
9. The font face.
10. The surrounding header level.
11. The immediately preceding header level.
12. The immediately preceding comment text.
13. Table body, header, footer, or none of these.
14. Caption or not a caption
15. The CSS class.
16. Beginning of the current nested structure or not.
17. The amount of preceding visual space.
18. The pattern of preceding visual breaks.

TABLE 1-continued

Feature set of an element description space

19. The number of preceding visual breaks.
20. The "path" through the document's nested structure.
21. The table row at the document structure depth.
22. The table column at the document structure depth.
23. The item count at the document structure depth. The item count includes all visually significant document elements, including images, tables, lists, etc.
24. The list item number at the document structure depth.
25. The column span width.
26. The row span width.
27. The id of the nested document structure.
28. Any attribute which remains constant over different instance of the Web page (over time).

The path description space assigns attributes to the path separating two Web page elements. A suitable feature set for path description space is described in Table 2.

TABLE 2 b. The feature set for path feature space

1. Sequence itself
2. Number of line breaks in the sequence
3. Number of table cells in one row in the sequence
4. Number of table cells in one column in the sequence
5. Relativized feature space attributes such as the number of links encountered between two elements, as determined by the amount of preceding visual space, the number of preceding visual breaks or the item list number at the document structure depth.

The PDCM feature sets described above in Tables 1 and 2 relate to Web page defined in HTML. It will be appreciated that a PDCM feature set could be determined for alternative mark-up languages including, without limitation, SGML (Standardized Generalized Mark-up Language), dynamic HTML, XML (Extended Mark-up Language), PDF (Portable document format) and Microsoft Word.

In block 32, one or more document elements for inclusion or exclusion in a virtual page are selected by a user using a graphical user interface (GUI) interaction with a visual presentation of the original electronic document. For example, the visual presentation of the original electronic document can include a visual display of an original Web page and highlighting of respective portions of the Web page as a cursor is moved within the original Web page by a mouse. The document elements can be selected by clicking on the respective highlighted portions. In block 33, the associated features of selected document elements are identified with features of the PDCM feature set. The associated features of the selected document elements are also identified based on the user intent to be included or excluded in the virtual page.

In block 34, the one or more identified features for each document element are collected into a set. Preferably one set of identified features is identified for one document element. For example, the identified document elements can be represented as a vector of features from the feature set of the PDCM element description space and the feature set from the PDCM path feature space. A pool of document elements is determined as a sum of all the sets of identified features, in block 35. The pool can also include the identified user's intent to include or exclude the document element in the virtual page. In block 36, a classification algorithm is applied to the pool of document elements to classify the one or more document elements based on their sets of identified features. The results of the classification algorithm yields one or more transformation rules. The set of features identified by the virtual tag and the related transformation rules constitutes the virtual tag object. Accordingly, the classification algorithm classifies the document elements based on their feature sets.

In block 37, the classified one or more document elements are indicated to the user in the visual presentation of the original Web page. Approval of the indicated classified document elements by the user is determined in block 38. If the user approves the classification of the document elements, the one or more virtual tags and transformation rules are established in block 39. If the user does not approve the classification of document elements, blocks 32-38 are repeated.

Figure 5:
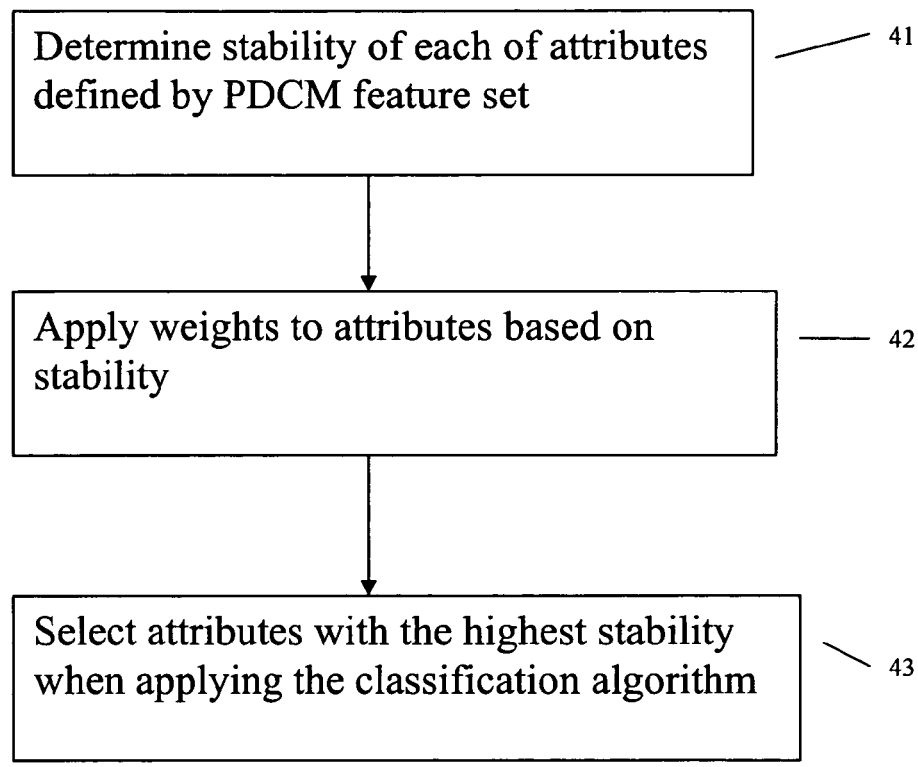
FIG. 5 is a flow diagram of a method for supplementing the implementation of the classification algorithm.

FIG. 5 is a method for supplementing the implementation of the classification algorithm, referred to as method 40. In block 41, the stability of each of the attributes defined by the PDCM feature set is determined. Attributes which are less stable are applied lower weights in block 42. In block 43, attributes having the highest stability are selected when applying the classification algorithm. Accordingly, the classification algorithm uses the unstable attributes as lower priority attributes as compared to more stable attributes which are used as higher priority attributes.

Figure 6:
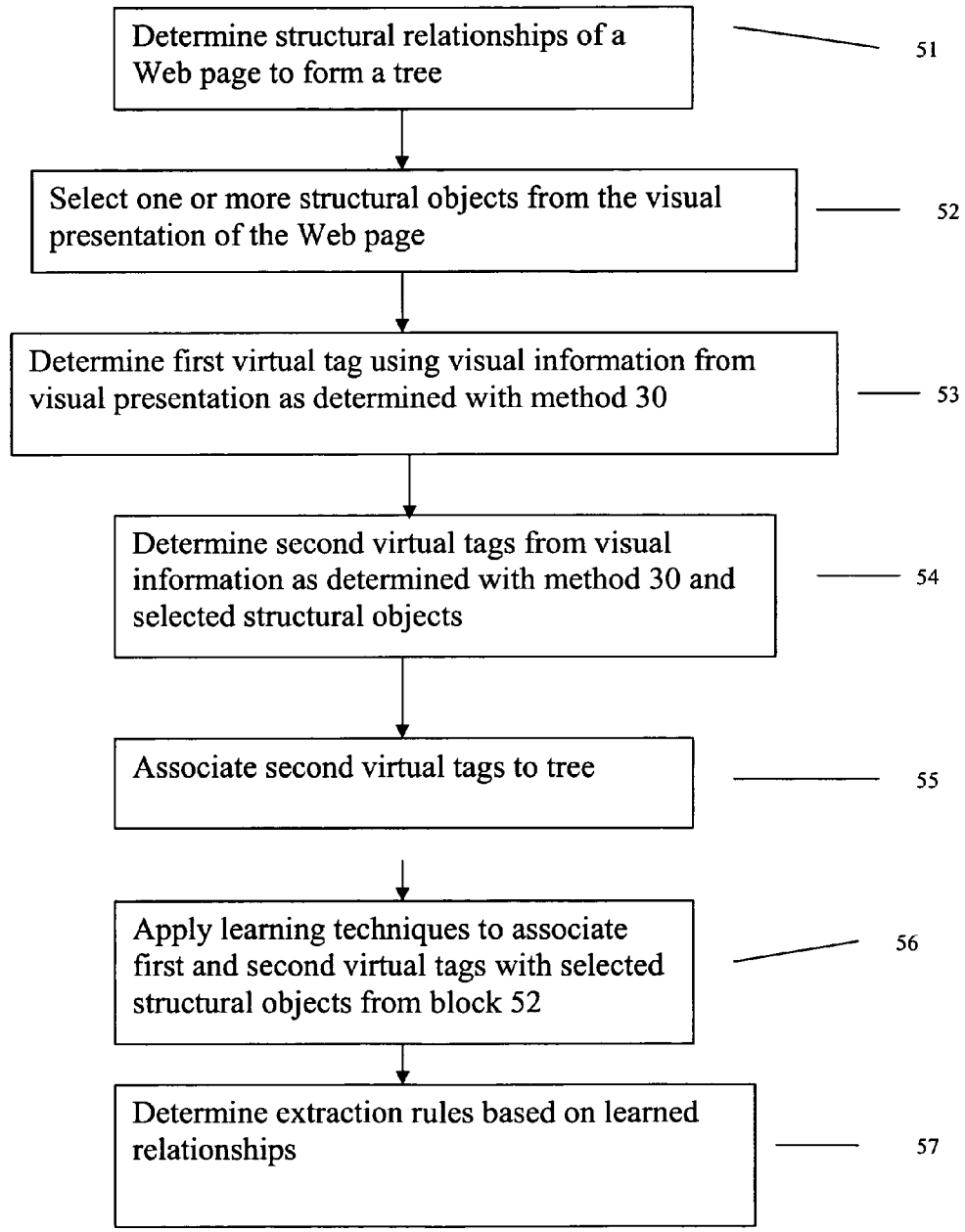
FIG. 6 illustrates a flow diagram of an alternative method for implementing the step of creating virtual tags.

FIG. 6 illustrates a flow diagram of an alternative method for implementing the step of creating virtual tags and extraction rules. In this method, referred to as method 50, a virtual tag is created using information derived from the visual presentation of an original document such as a Web page, as described above, and structural information related to the Web page. In block 51, the original Web page is processed to form a tree representation of the internal structure relationships of the original Web page. For example, the internal structural information of the original Web page can be determined from the HTML code used to generate the original Web page. The tree contains all potential structural relationships between objects and subobjects. The tree can comprise connected internal structural nodes and leaves.

In block 52, the structural relationships of which the user is interested are selected from a visual presentation of the original Web page. For example, the visual presentation is interacted with a GUI. The GUI can include a point and click interface to enable the user to select one or more structural objects from the original Web page document. In block 53, one or more first virtual tags are determined using the visual presentation of the original Web page, as described above in method 30. In block 54, one or more second virtual tags are determined from information derived from the visual presentation of the original Web page and the selected structural objects. The one or more second virtual tags are associated with the tree, in block 55. In block 56, learning techniques are applied to the second virtual tags with structural objects determined in block 52. In block 57, one or more transformation rules are determined based upon the relationships learned in block 53 and block 56.

Figure 7:
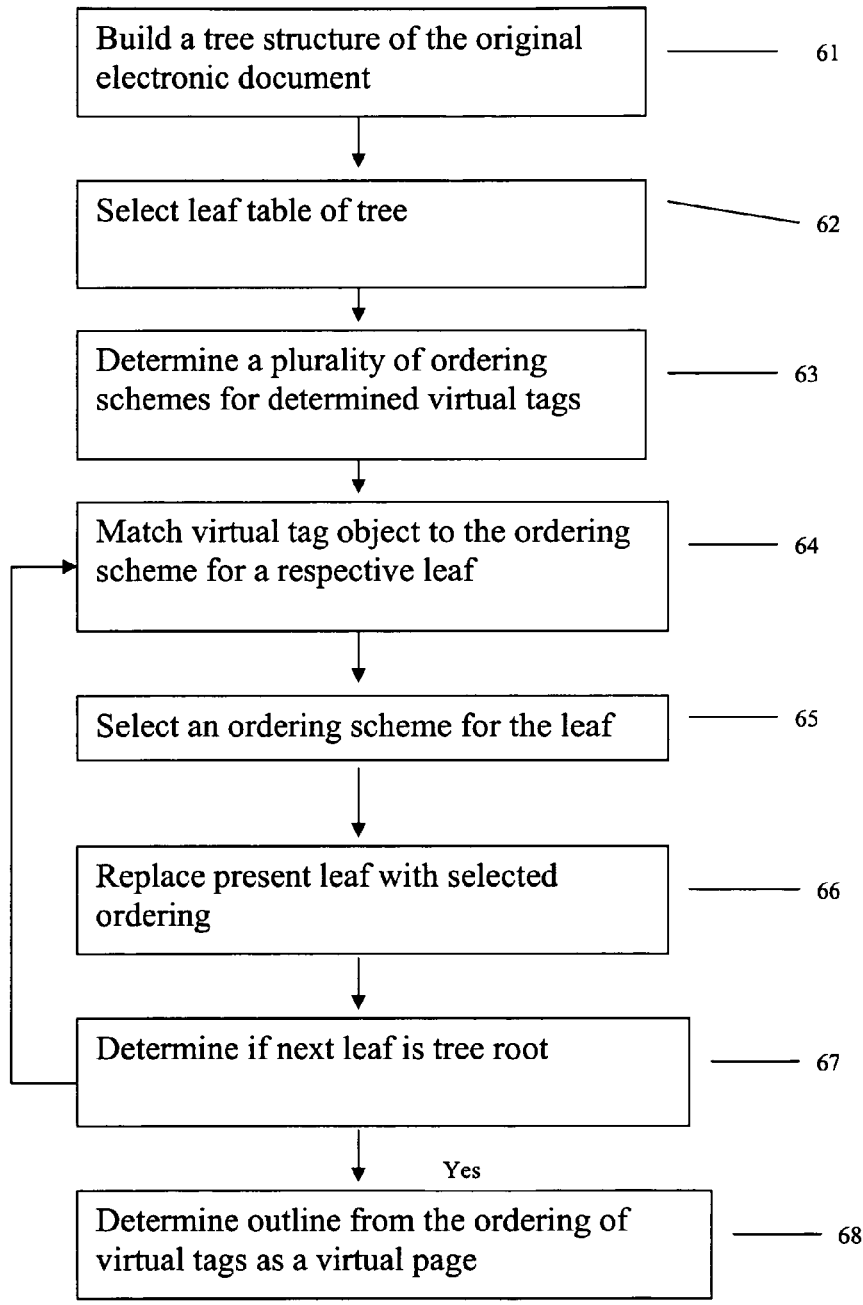
FIG. 7 is a flow diagram of a method for implementing the step to create a virtual page from retrieved virtual tag objects.

FIG. 7 is a flow diagram of a method for implementing the step to create a virtual page from retrieved virtual tag objects, referred to as method 60. In block 61, a tree structure is derived from the original electronic document. For example, the tree can be determined by the user system from the HTML code of an original Web page.

As an example, if the original document is organized as a table (T), a tree (T) is defined as a tree built from table (T). T is defined as a root of table (T). Table (T) can be a nested table such that if a table is a cell in a table than there is a directed edge from the table to the cell. In block 62, a leaf table L of tree (T) is selected. In block 63, a plurality of ordering schemes are determined for the retrieved virtual tags for creating a virtual page. A representative ordering of a table is shown in table 3.

TABLE 3

| HEADING1 | HEADING2 | HEADING3 | HEADING4 |
| BODY1 | BODY2 | BODY3 | BODY4 |

An example of an ordering scheme for table 3 is a document ordering scheme in which the virtual tags are ordered left to right and top to bottom, as shown in table 4.

TABLE 4

| HEADING1 | HEADING2 | HEADING3 | HEADING4 | BODY1 | BODY2 | BODY3 | BODY4 |

A second example of an ordering scheme for table 3 is a transposed ordering scheme, as shown in table 5.

TABLE 5

| HEADING1 | BODY1 | HEADING2 | BODY2 | HEADING3 | BODY3 | HEADING4 | BODY4 |

In block 64, virtual tag objects are matched to each of the determined ordering schemes. An ordering scheme is selected for a leaf in block 65. For example the ordering scheme can be selected by letting c(o) be the number of instances in o which are out of order and selecting the ordering as having the largest c(o). In the previous example, the c(o) of table 4 is zero because there are no virtual tags out of document order and the c(o) of table 5 is six (6) because there are six virtual tag instances that are out of document order. In this example, c(o) is determined as six because: HEADING2 is preceded by BODY1, HEADING3 is preceded by BODY1 and BODY2, HEADING4 is preceded by BODY1, BODY2 and BODY3.

In block 66, a parent leaf of table L is replaced with the selected ordering. Accordingly, tree (T) has been reduced by one table L. In block 67, a determination is made as to whether the next leaf is a tree root. If the next leaf is not a tree root, blocks 64-67 are repeated. If the next leaf is a tree root, tree T is replaced with the final determined ordering. An outline of the final determined ordering is determined and is used to form a virtual page. In the outline, the first ordered tag is the topmost outline item and subsequent tags are subordinate.

Figure 8:
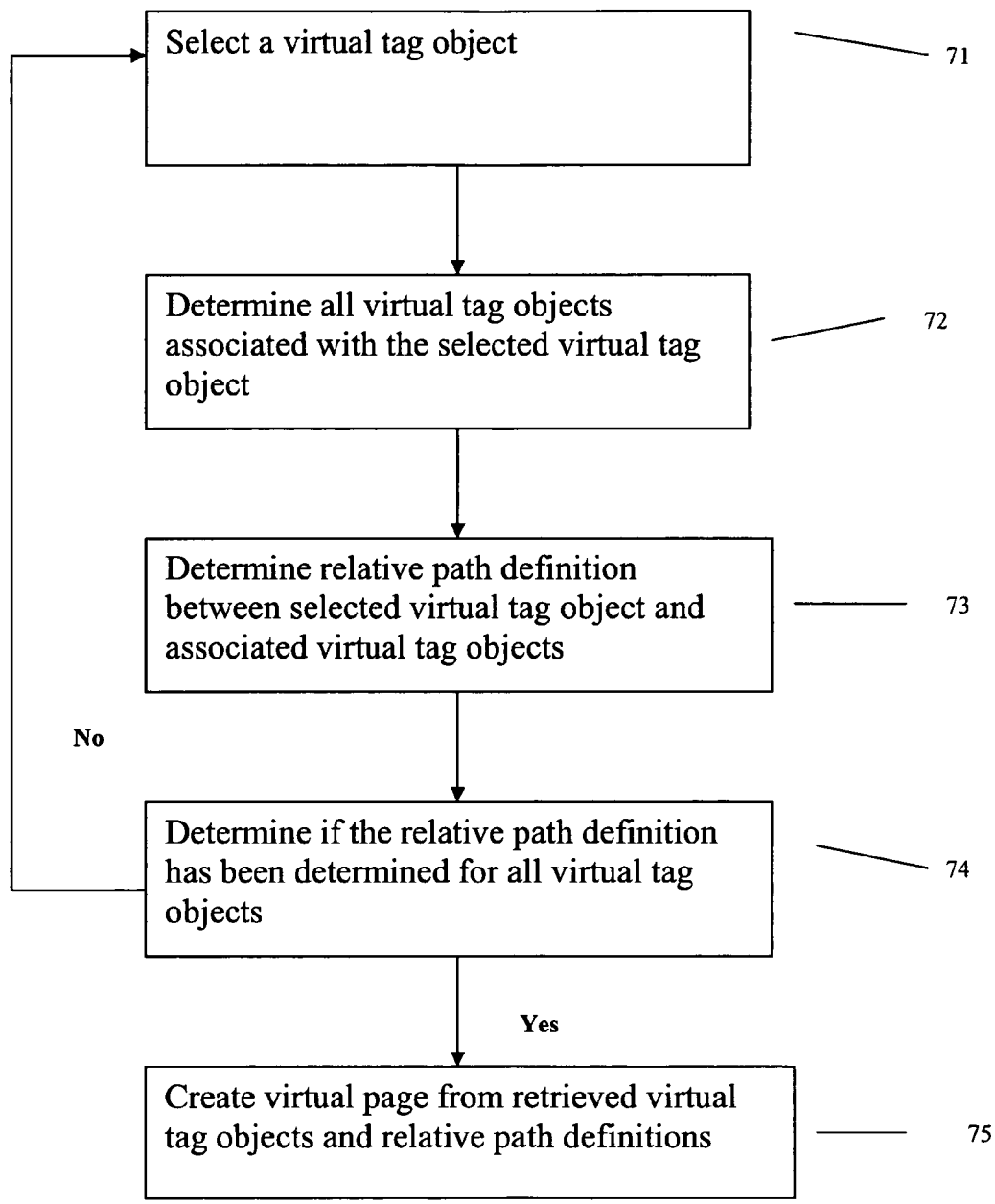
FIG. 8 illustrates a flow diagram of an alternate method for implementing the step to create a virtual page from retrieved virtual tag objects.

FIG. 8 illustrates a flow diagram of an alternate method for implementing the step to create a virtual page from retrieved virtual tag objects, referred to as method 70. In block 71, a virtual tag object is selected as an anchoring virtual tag object. In block 72, all virtual tags are determined that are associated with the anchoring virtual tag object. A relative path definition is determined between the anchoring virtual tag and the associated virtual tag object in block 73. For example, the relative path definition can be determined using learning techniques of the PDCM path feature space, described above, of the anchoring virtual tag object and the associated virtual tag objects.

In block 74 a determination is made as to if the relative path definition has been determined for all virtual tag objects. If the relative path definition has been determined for all virtual tag objects, a virtual page is created from the retrieved virtual tag objects and relative path definition in block 75. If the relative path definition has not been determined for all virtual tag objects, blocks 71-74 are repeated.

Figure 9A:
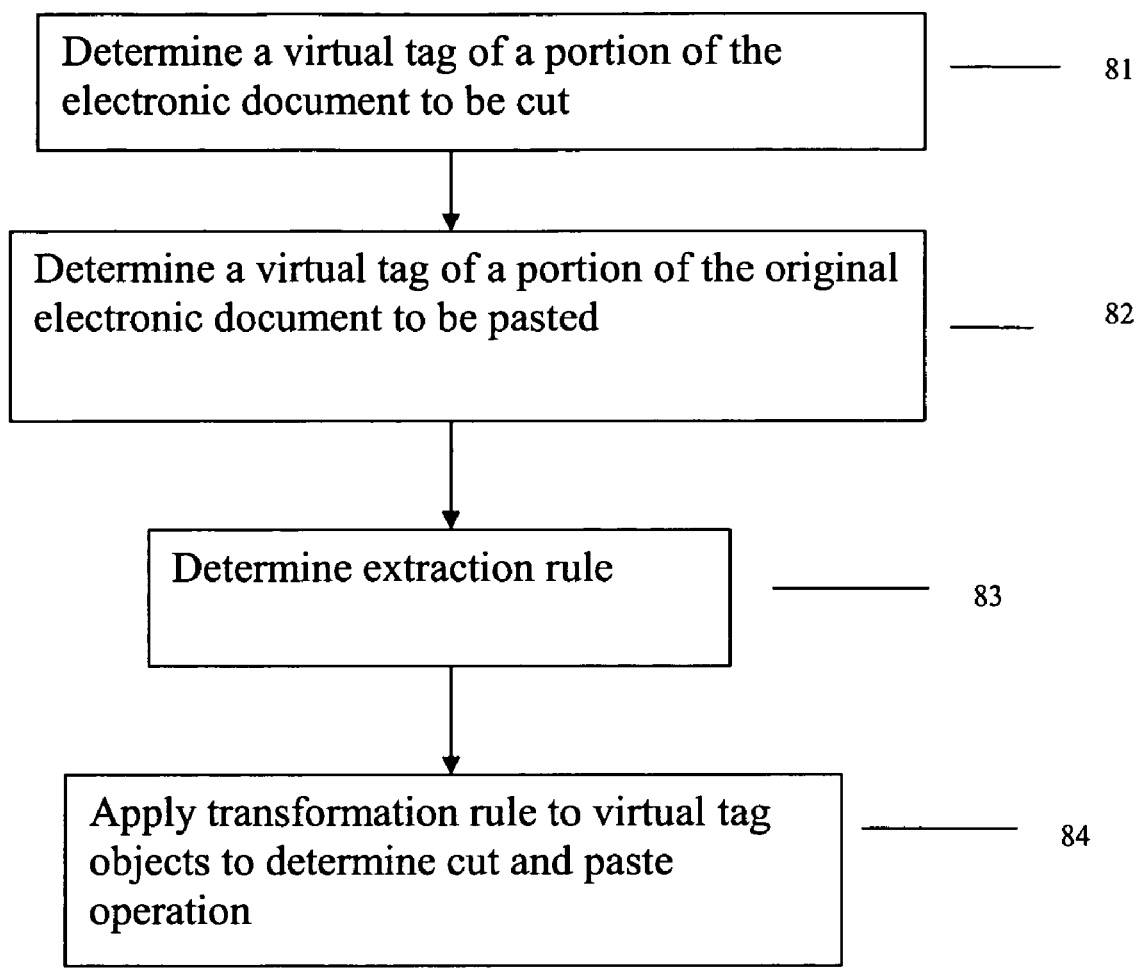
FIG. 9A is a flow diagram of a process of editing dynamic documents with a cut and paste command.

A process of editing dynamic documents with a cut and paste command is depicted in FIG. 9A. A dynamic document is a document which changes over time. In block 81, a virtual tag is determined for a portion of an original electronic document which is intended to be cut from the original electronic document and pasted to a different location. A virtual tag is determined for a portion of the original electronic document which is intended to be pasted, in block 82. For example, blocks 81 and 82 can be implemented using the visual presentation of an original Web page and identifying the document elements using features of the PDCM feature set, as described above. A transformation rule is determined with learning techniques to identify the location of the cut and the location to paste the cut out portion, in block 83. In block 84, the transformation rules and virtual objects are used for determining a cut and paste operation. For example, the cut and paste operations can be used in all future versions of the original Web page. In alternate embodiments, the document can be a hyperlinked document which comprises indirect links. The indirect link can be cut and pasted by virtually tagging the link and determining transformation rules to define the indirect link.

Figure 9B:
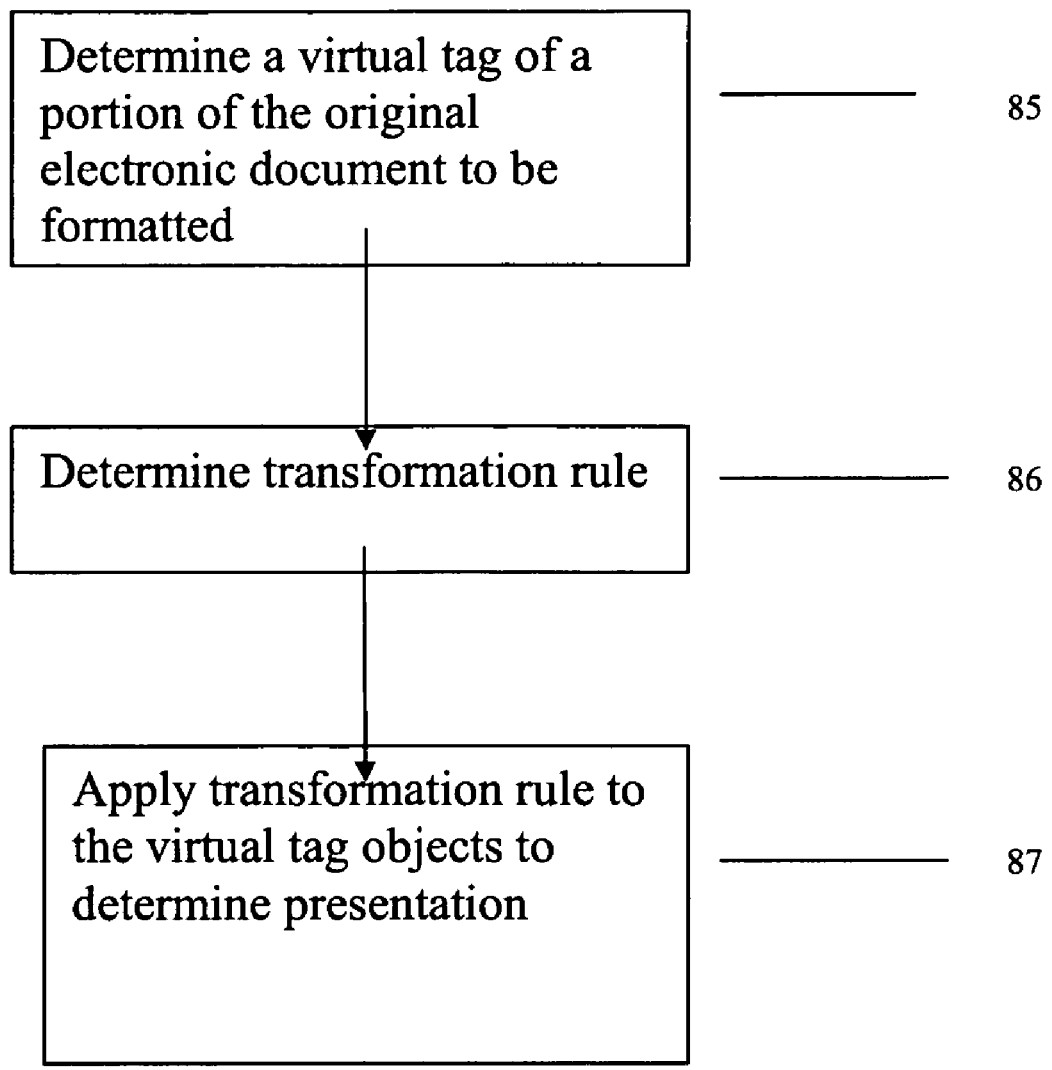

In another alternate embodiment a process of editing dynamic documents by reformatting of font features, such as font size, color and the like, is shown in FIG. 9B. In block 85, a virtual tag is determined for a portion of the original electronic document to be reformatted. A transformation rule is determined with learning techniques to identify the location to reformat, in block 86. In block 87, the transformation rule is applied to the virtual tag object to determine presentation of reformatting of the original electronic document.

Figure 10:
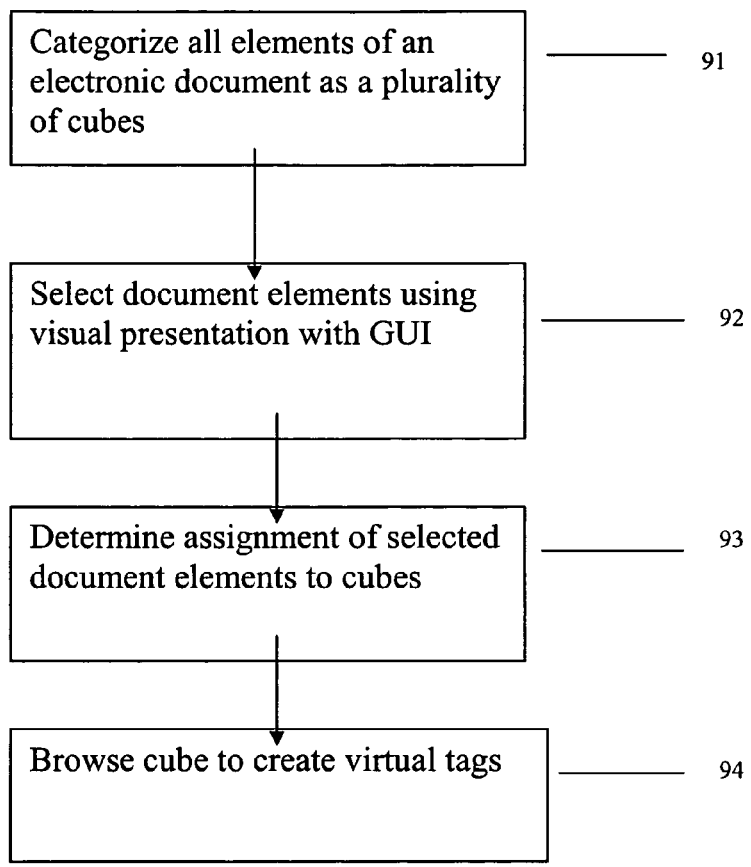
FIG. 10 is a flow diagram of an alternate method for creating virtual tags.
Figure 11:
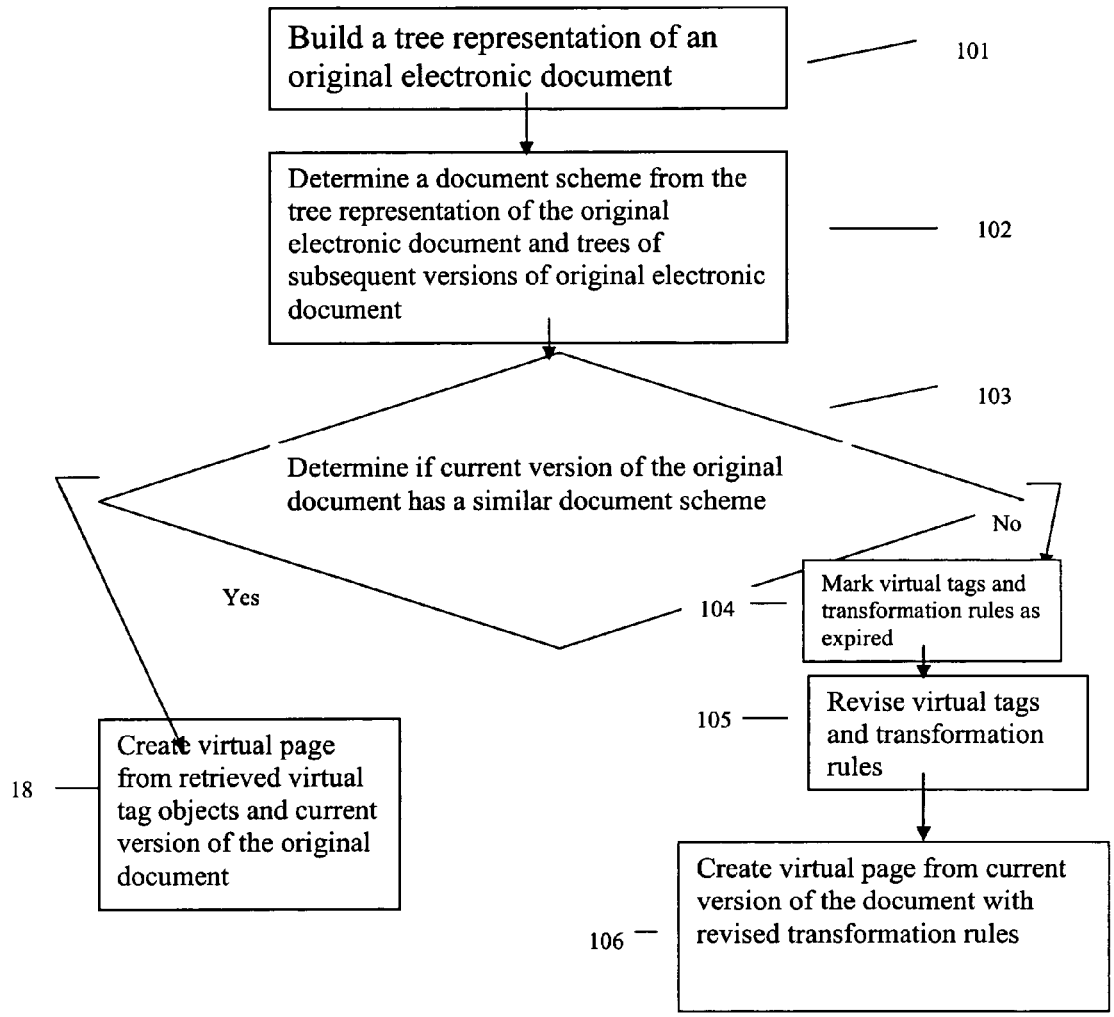
FIG. 11 is a flow diagram of a method for determining a document scheme of a Web page.

In FIG. 10, an alternate method for creating virtual tags is described, which is referred to as method 90. In block 91, all elements of an electronic document such as a Web page are categorized as a plurality of OLAP cubes. The user selects document elements using a GUI with the visual presentation of the original electronic document. In block 93, the selected document elements are assigned to the OLAP cubes. Preferably the document elements are assigned to the OLAP cubes such that the document elements belong to the same OLAP cube if they have the same values of selected features. For example, if two document elements have the same font and the same size the two document elements are assigned to the same OLAP cube. For example, the document elements can be defined in the PDCM element feature space and/or the PDCM path feature space.

In block 94, the OLAP cubes can be browsed using conventional roll up and roll down operations as described in Online Analytical Processing (OLAP). A roll-down operation splits an OLAP cube into smaller OLAP cubes by adding an additional feature, thereby further identifying the document element. A roll-up operation expands an OLAP cube by dropping one or more features from the OLAP cube definition. One or more virtual tags can be represented by the established OLAP cubes.

Method 10 provides transformation rules which can be determined once during training with visual feedback from the user and can be used subsequently with any dynamic electronic document that has not substantially changed from the original electronic document without needing additional visual feedback from the user. FIG. 10 illustrates a method for determining if the document scheme of the recent version of the electronic document is substantially the same as the original version of the electronic document, referred to as method 100. In block 101, a tree representation of an original electronic document is built. The tree representation defines the document scheme for the original electronic document down to the smallest individual element, such as words. For example, the tree representation can be performed automatically for a Web page by parsing HTML source code.

A document scheme is determined by intersecting the tree representation of the original electronic document with alternate versions of the original electronic document, in block 102. For example, the original electronic document can be a Web page or a chapter from a book. The intersection can be defined as the largest subtree which is common to all versions. Each of the versions can be the same or different as the original version. The document scheme can be determined during the training aspect of method 10, described above. The document scheme is defined when the intersection no longer changes.

In block 103, a determination is made if the current version of the original document has a document scheme which is substantially similar, to the document scheme determined in block 101 such as being within a threshold value. If the document scheme of the current electronic document is substantially similar to the previously determined document scheme, block 18 is performed to create a virtual page from retrieved virtual tag objects and the current version of the original electronic document. If the document scheme of the current electronic document is not substantially similar to the previously determined document scheme previously defined virtual tags and transformation rules are marked as expired, in block 104. The previously defined virtual tags and transformation rules are revised to be used with the current document scheme in block 105. In block 106, a virtual page is created from the current version of the document and the revised virtual tags and revised transformation rules. In an embodiment of the present invention, the marking of the expiration clause of the virtual tag can be checked before generating a virtual page in block 15 of FIG. 2.

Figure 12:
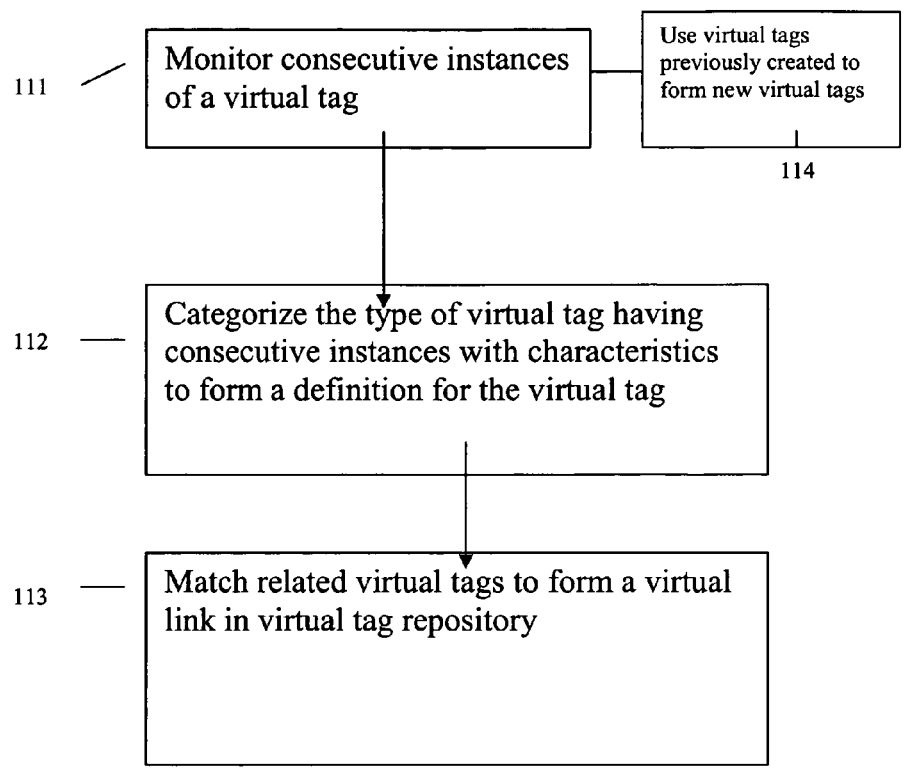
FIG. 12 is a flow diagram of a method for learning the types of virtual tags which are stored in the virtual repository and creating virtual links.

As described above, virtual repositories can store virtual tags and virtual pages for more than one user. In FIG. 12, a method is described for learning the types of virtual tags which are stored in the virtual tag repository and creating virtual links which is referred to as method 110. In block 111, the virtual tag repository is monitored to determine consecutive instances of a virtual tag. A type of the virtual tag is determined for virtual tags having consecutive instances, in block 112. The type can be determined by categorizing the virtual tag with characteristics. Suitable characteristics include: character heights, such as average and variance; numerical, alpha-numeric; presence of distinct characters, such as ":" in a sports score.

In block 113, virtual tags having similar definitions are matched to form a virtual link in the virtual tag repository. The virtual link is useful for performing a query across different virtual pages. In application of method 110, the determined definition of the virtual tag can be used by a first user to access a specified virtual tag which was previously created by the first user or a second user. The predefined virtual tag can be combined with virtual tags created by the user to define the virtual page. Similarly, virtual linking determined in block 113 can be combined with virtual tags created by the user to define the virtual page. In block 114, a user can use the information on monitored virtual tags which were previously created by users to create new virtual tags, transformation rules and virtual pages.

Transformation rules determined during the application of method 10 can be parameterized in order to apply a generated transformation rule to a family of pages having the same document structure. The family of pages are linked with indirect addressing or are parameterized by name. Accordingly, if a transformation rule is determined for a first page and a linked second page has a similar structure to the first page, the transformation rule determined for the first page can be used as the transformation rule for the second page. For example, each stock may have a different page describing its performance and data about the company, such stock pages can be accessed either by filling the box with the stock's name which is parameterized access through a box, or through a symbolic link like "Stock of the day" which can lead to different stock every day. The pages are homogeneous in terms of structure and the same transformation rules can be used to, for example, extract the stock's quote.

In summary, virtual tags are indirect physical tags for providing the ability to tag existing electronic document elements such as table cells, elements of ordered and unordered lists, paragraphs, titles, subtitles, etc. The virtual tag is a context dependent tag for providing the ability to tag changing content based on the patterns that precede and follow the content on an electronic document such as a Web page, for example, a virtual tag may delimit all entries of a dated list up to a certain date, when such data is present; and inclusive tags for providing the ability to tag different structures that contain a given pattern, such as a word or phrase, for example, a virtual tag may delimit a paragraph based on the existence of words within it.

It must also be made clear that while some of the description of this invention is directed toward it application to Web based information, it is also applicable to other forms of information available through other Internet technologies.

It is understood that the above-described embodiments are illustrative of only a few of the many possible specific embodiments which can represent applications of the principles of the invention. Numerous and varied other arrangements can be readily derived in accordance with these principles by those skilled in the art without departing from the spirit and scope of the invention.

What is claimed is:

1. A method for transforming a dynamically changing electronic document comprising the steps of:
providing a visual representation of one or more instances of a dynamically changing electronic document to a user;
receiving feedback from interaction by said user with said visual representation, said feedback identifying one or more portions of said visual representation, said feedback being used to generate one or more virtual tags, said virtual tags identifying features of said one or more portions of said visual representation;
constructing one or more transformation rules using said feedback and said one or more virtual tags; and
applying said one or more transformation rules to said one or more instances of said electronic document, a second electronic document or future versions of said one or more instances of said electronic document to extract customized content identified from said one or more virtual tags and generate a virtual page of said customized content; and
providing a visual representation of said virtual page.

2. The method of claim 1 wherein said electronic document is a Web page and said future version is a more recent version of said Web page.

3. The method of claim 1 further comprising the step of:
storing said one or more virtual tags with said one or more transformation rules as a respective one or more virtual tag objects in a virtual tag repository; and
retrieving said one or more stored virtual tag objects from said virtual repository when subsequently accessing said electronic document, said stored one or more transformation rules being used to generate said virtual page.

4. The method of claim 3 wherein said virtual page is generated by the steps of:
h. building a tree structure of said one or more instances of said electronic document;
i. selecting a leaf table of said tree structure;
j. determining a plurality of ordering schemes for said virtual tag objects;
k. matching said virtual tag objects to said ordering schemes for a leaf of said leaf table;
l. selecting an ordering scheme for said leaf;
m. replacing a parent leaf of said leaf table with said selected ordering; and
n. determining if a next leaf is a tree root, wherein if said next leaf is a tree root determining an outline from said ordering of virtual tags as a virtual page or if said next leaf is not a tree root repeating step h through step n.

5. The method of claim 3 wherein said virtual page is generated by the steps of:
o. selecting one of said one or more retrieved virtual tag objects;
p. determining said one or more virtual tag objects associated with said selected retrieved virtual tag object;
q. determining a relative path definition between said selected retrieved virtual tag object and said determined associated virtual tag objects; and
r. determining if said relative path definition has been determined for all of said virtual tag objects, wherein if said relative path definition has been determined for all of said virtual tag objects, creating a virtual page from said retrieved virtual tag objects and said relative path definition or if said relative path definition has not been determined for all of said virtual tag objects repeating step o. through step r.

6. The method of claim 3 further comprising the steps of:
building a tree representation of said one or more instances of said electronic document; and
determining a document scheme from said tree representation of said one or more instances of said electronic document and a tree structure of alternate versions of said one or more instances of said electronic document.

7. The method of claim 6 further comprising the steps of:
determining if a more recent version of said one or more instances of said electronic document has a document scheme similar to said determined document scheme, wherein if said more recent version of said one or more instances of said electronic document has a document scheme similar to said determined document scheme, creating said virtual page from said retrieved one or more virtual tag objects and said most recent version of said one or more instances of said electronic document;

if said more recent version of said one or more instances of said electronic document does not have a document scheme similar to said determined document scheme, revising said virtual tags and said one or more transformation rules; and creating said virtual page from said most recent version of said one or more instances of said electronic document with said revised one or more virtual tags and said revised one or more transformation rules.

8. The method of claim 7 wherein if said more recent version of said one or more instances of said electronic document does not have a document scheme similar to said determined document scheme, further comprising the step of:

marking said virtual tags and said transformation rules as expired.

9. The method of claim 3 further comprising the steps of:

monitoring consecutive instances of said stored one or more virtual tags;

categorizing the type of said stored one or more virtual tag having consecutive instances with characteristics to form a definition for said one or more virtual tags; and matching related one or more virtual tags to form a virtual link in said virtual tag repository.

10. The method of claim 3 wherein said virtual tag object is formatted as an extensible markup language (XML) view.

11. The method of claim 1 wherein a first said one or more virtual tags is a portion of said one or more instances of said electronic document to be cut and a second one of said one or more virtual tags is a portion of said electronic document to be pasted and said one or more transformation rules being constructed from said first virtual tag and said second virtual tag for determining a cut and paste operation.

12. The method of claim 1 wherein said one or more virtual tags is a portion of a Web page to be formatted for determining a presentation of said virtual page.

13. The method of claim 12 wherein said one or more transformation rules are applied to a more recent version of said original Web pages.

14. The method of claim 1 wherein said visual representation is accessed with a graphical user interface.

15. The method of claim 1 wherein said graphical user interface includes a proxy for monitoring actions of said user.

16. The method of claim 1 further comprising the step of:

monitoring the one or more virtual tags and the one or more transformation rules.

17. The method of claim 16 wherein said monitoring step provides microstatistics of the use of said one or more virtual tags and said one or more transformation rules.

18. The method of claim 16 wherein said monitoring step provides monitoring of a user subscription to said one or more virtual tags or one or more transformation rules.

19. The method of claim 16 wherein said monitoring step further comprises the step of:

sending a message to a content provider after creation of predefined one or more of said virtual tags.

20. The method of claim 1 wherein said one or more virtual tags previously constructed are used for constructing one or more new virtual tags and one or more new transformation rules.

21. The method of claim 1 further comprising the step of:

linking said transformation rules to parameterized pages.

22. The method of claim 1 wherein said one or more instances of said electronic document is a chapter of a book and said second electronic document is a plurality of chapters of said book.

23. The method of claim 1 further comprising the steps of;

a user approving said visual representation of said virtual page; or a user disapproving said visual representation of said virtual page, wherein when said visual representation is disapproved, revising said one or more virtual tags or transformation rules to form revised virtual tags or revised transformation rules and applying said one or more revised virtual tags and said one or more revised transformation rules to said one or more instances of said electronic document, said second electronic document having a similar structure as said one or more instances of said electronic document or said future versions of said one or more instances of said electronic document.

24. A system for transforming a dynamically changing electronic document comprising:

means for providing a visual representation of one or more instances of a dynamically changing electronic document to a user;

means for receiving feedback from interaction by said user with said visual representation, said feedback identifying one or more portions of said visual representation, said feedback being used to generate one or more virtual tags, said virtual tags identifying features of said one or more portions of said visual representation;

means for constructing one or more transformation rules using said feedback and said one or more virtual tags; and means for applying said one or more transformation rules to said one or more instances of said electronic document, a second electronic document or future versions of said one or more instances of said electronic document to extract customized content identified from said one or more virtual tags and generate a virtual page of said customized content.

25. The system of claim 24 wherein said electronic document is a Web page and said future version is a more recent version of said Web page.

26. The system of claim 24 further comprising:

means for storing said one or more virtual tags with said one or more transformation rules as a respective one or more virtual tag objects in a virtual repository; and means for retrieving said one or more stored virtual tag objects from said virtual repository when subsequently accessing said electronic document, said stored one or more transformation rules being used to generate said virtual page.

27. The system of claim 26 wherein said virtual page is generated by:

means for building a tree structure of said one or more instances of said electronic document;

means for selecting a leaf table of said tree structure;

means for determining a plurality of ordering schemes for said virtual tag objects;

means for matching said virtual tag objects to said ordering schemes for a leaf of said leaf table;

means for selecting an ordering scheme for said leaf;

means for replacing a parent leaf of said leaf table with said selected ordering; and means for determining if a next leaf is a tree root, wherein if said next leaf is a tree root determining an outline from said ordering of virtual tags as said virtual page.

28. The system of claim 26 wherein said virtual page is generated by:
- means for selecting one of said one or more retrieved virtual tag objects;
- means for determining said one or more virtual tag objects associated with said selected retrieved virtual tag object;
- means for determining a relative path definition between said selected retrieved virtual tag object and said determined associated virtual tag objects; and
- means for determining if said relative path definition has been determined for all of said virtual tag objects, wherein if said relative path definition has been determined for all of said virtual tag objects, creating a virtual page from said retrieved virtual tag objects and said relative path definition.

29. The system of claim 26 comprising:
- means for building a tree representation of said one or more instances of said electronic document; and
- means for determining a document scheme from said tree representation of said original electronic document and a tree structure of alternate versions of said original electronic document.

30. The system of claim 29 further comprising:
- means for determining if a more recent version of said one or more instances of said electronic document has a document scheme similar to said determined document scheme;
- means for creating said virtual page from said retrieved one or more virtual tag objects and said most recent version of said one or more instances of said electronic document, if said more recent version of said original electronic document has a document scheme similar to said determined document scheme; or
- means for revising said virtual tags and said one or more transformation rules, if said more recent version of said one or more instances of said electronic document does not have a document scheme similar to said determined document scheme; and
- means for creating said virtual page from said most recent version of said original electronic document with said revised one or more virtual tags and said revised one or more transformation rules.

31. The system of claim 30 further comprising:
- means for marking said virtual tags and said transformation rules as expired, if said more recent version of said one or more instances of said electronic document does not have a document scheme similar to said determined document scheme.

32. The system of claim 26 further comprising:
- means for monitoring consecutive instances of said stored one or more virtual tags;
- means for categorizing the type of said stored one or more virtual tags having consecutive instances with characteristics to form a definition for said one or more virtual tags; and
- means for matching related one or more virtual tags to form a virtual link in said virtual tag repository.

33. The system of claim 26 wherein said virtual tag object is formatted as an extensible markup language (XML) view.

34. The system of claim 26 further comprising:
- means for monitoring the one or more virtual tags and the one or more transformation rules.

35. The system of claim 34 wherein said means for monitoring provides microstatistics of the use of said one or more virtual tags and said one or more transformation rules.

36. The system of claim 34 wherein said means for monitoring provides monitoring of a user subscription to said one or more virtual tags or one or more transformation rules.

37. The system of claim 34 wherein said means for monitoring further comprises means for sending a message to a content provider after creation of predefined one or more of said virtual tags.

38. The system of claim 26 wherein said one or more virtual tags previously constructed are used for constructing one or more new virtual tags and one or more new transformation rules.

39. The system of claim 24 wherein a first said one or more virtual tags is a portion of said one or more instances of said electronic document to be cut and a second one of said one or more virtual tags is a portion of said electronic document to be pasted and said one or more transformation rules being constructed from said first virtual tag and said second virtual tag for determining a cut and paste operation.

40. The system of claim 24 wherein said one or more virtual tags is a portion of a Web page to be formatted for determining a presentation of said virtual page.

41. The system of claim 40 wherein said one or more transformation rules are applied to a more recent version of said original Web page.

42. The system of claim 24 wherein said visual representation is accessed with a graphical user interface.

43. The system of claim 24 wherein said graphical user interface includes a proxy for monitoring actions of said user.

44. The system of claim 24 further comprising:
- means for linking said transformation rules to parameterized pages.

45. The system of claim 24 wherein said one or more instances of said electronic document is a chapter of a book and said second electronic document is a plurality of chapters of said book.

46. The system of claim 24 comprising:
- means for approving said visual representation of said virtual page; or
- means for user disapproving said visual representation of said virtual page, wherein when said visual representation is disapproved revising said one or more virtual tags or said transformation rules to form revised virtual tags or revised transformation rules and applying said one or more revised transformation rules to said one or more instances of said electronic document, said second electronic document having a similar structure as said one or more instances of said electronic document or said future versions of said one or more instances of said electronic document.

47. A computer program product for transforming a dynamically changing electronic document comprising:
- means for providing a visual representation of one or more instances of a dynamically changing electronic document to a user;
- means for receiving feedback from interaction by the user with the visual representation, said feedback identifying one or more portions of said visual representation, said feedback being used to generate one or more virtual tags, said virtual tags identifying features of said one or more portions of said visual representation;
- means for constructing one or more transformation rules using said feedback and said one or more virtual tags; and
- means for applying said one or more transformation rules to said one or more instances of said electronic document, a second electronic document or future versions of said one or more instances of said electronic document to extract customized content identified from said one or more virtual tags and generate a virtual page of said customized content.

48. The computer program product of claim 47 wherein said electronic document is a Web page and said future version is a more recent version of said original Web page.

49. The computer program product of claim 47 further comprising:
- means for storing said one or more virtual tags with said one or more transformation rules as a respective, one or more virtual tag objects in a virtual repository; and
- means for retrieving said one or more stored virtual tag objects from said virtual repository when subsequently accessing said electronic document, said stored one or more transformation rules being used to generate said virtual page.

50. The computer program product of claim 49 wherein said virtual page is generated by:
- means for building a tree structure of said one or more instances of said electronic document;
- means for selecting a leaf table of said tree structure;
- means for determining a plurality of ordering schemes for said virtual tag objects;
- means for matching said virtual tag objects to said ordering schemes for a leaf of said leaf table;
- means for selecting an ordering scheme for said leaf;
- means for replacing a parent leaf of said leaf table with said selected ordering; and
- means for determining if a next leaf is a tree root, wherein if said next leaf is a tree root determining an outline from said ordering of virtual tags as said virtual page.

51. The computer program product of claim 49 wherein said virtual page is generated by:
- means for selecting one of said one or more retrieved virtual tag objects;
- means for determining said one or more virtual tag objects associated with said selected retrieved virtual tag object;
- means for determining a relative path definition between said selected retrieved virtual tag object and said determined associated virtual tag objects; and
- means for determining if said relative path definition has been determined for all of said virtual tag objects, wherein if said relative path definition has been determined for all of said virtual tag objects, creating a virtual page from said retrieved virtual tag objects and said relative path definition.

52. The computer program product of claim 49 wherein a first said one or more virtual tags is a portion of said one or more instances of said electronic document to be cut and a second one of said one or more virtual tags is a portion of said electronic document to be pasted and said one or more transformation rules being constructed from said first virtual tag and said second virtual tag for determining a cut and paste operation.

53. The computer program product of claim 49 wherein said one or more virtual tags is a portion of a Web page to be formatted for determining a presentation of said virtual page.

54. The computer program product of claim 53 wherein said one or more transformation rules are applied to a more recent version of said original Web page.

55. The computer program product of claim 49 comprising:
- means for building a tree representation of said one or more instances of said electronic document; and
- means for determining a document scheme from said tree representation of said original electronic document and a tree structure of alternate versions of said original electronic document.

56. The computer program product of claim 55 further comprising:
- means for determining if a more recent version of said one or more instances of said electronic document has a document scheme similar to said determined document scheme,
- means for creating said virtual page from said retrieved one or more virtual tag objects and said most recent version of said one or more instances of said electronic document, if said more recent version of said original electronic document has a document scheme similar to said determined document scheme; or
- means for revising said virtual tags and said one or more transformation rules, if said more recent version of said one or more instances of said electronic document does not have a document scheme similar to said determined document scheme; and
- means for creating said virtual page from said most recent version of said one or more instances of said electronic document with said revised one or more virtual tags and said revised one or more extraction rules.

57. The computer program product of claim 56 further comprising:
- means for marking said virtual tags and said transformation rules as expired if said more recent version of said one or more instances of said electronic document does not have a document scheme similar to said determined document scheme.

58. The computer program product of claim 49 further comprising:
- means for monitoring consecutive instances of said stored one or more virtual tags;
- means for categorizing the type of said stored one or more virtual tags having consecutive instances with characteristics to form a definition for said one or more virtual tags; and
- means for matching related one or more virtual tags to form a virtual link in said virtual tag repository.

59. The computer program product of claim 49 wherein said virtual tag object is formatted as an extensible markup language (XML) view.

60. The computer program product of claim 49 further comprising:
- means for monitoring the one or more virtual tags and the one or more transformation rules.

61. The computer program product of claim 60 wherein said monitoring means provides microstatistics of the use of said one or more virtual tags and said one or more transformation rules.

62. The computer program product of claim 60 wherein said monitoring means provides monitoring of a user subscription to said one or more virtual tags or one or more transformation rules.

63. The computer program product of claim 60 wherein said monitoring means further comprises means for sending a message to a content provider after creation of predefined one or more of said virtual tags.

64. The system of claim 49 wherein said one or more virtual tags previously constructed are used for constructing one or more new virtual tags and one or more new transformation rules.

65. The computer program product of claim 47 wherein said visual representation is accessed with a graphical user interface.

66. The computer program product of claim 47 wherein said graphical user interface includes a proxy for monitoring actions of said user.

67. The computer program product of claim 47 further comprising: means for linking said transformation rules to parameterized pages.

68. The computer program product of claim 47 wherein said original electronic document is a chapter of a book and said second electronic document is a plurality of chapters of said book.

* * * * *